United States Patent
Yashiro et al.

(10) Patent No.: US 11,458,969 B2
(45) Date of Patent: Oct. 4, 2022

(54) VEHICLE CONTROL DEVICE, AND VEHICLE

(71) Applicant: HONDA MOTOR CO., LTD., Tokyo (JP)

(72) Inventors: Katsuya Yashiro, Wako (JP); Hiroshi Oguro, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 338 days.

(21) Appl. No.: 16/830,823

(22) Filed: Mar. 26, 2020

(65) Prior Publication Data

US 2020/0307583 A1    Oct. 1, 2020

(30) Foreign Application Priority Data

Mar. 27, 2019   (JP) .............................. JP2019-061466

(51) Int. Cl.
| | | |
|---|---|---|
| *B60W 30/16* | (2020.01) | |
| *B60W 30/14* | (2006.01) | |
| *G05D 1/02* | (2020.01) | |

(52) U.S. Cl.
CPC .......... *B60W 30/16* (2013.01); *B60W 30/143* (2013.01); *G05D 1/0223* (2013.01)

(58) Field of Classification Search
CPC ............... B60W 30/16; B60W 30/143; B60W 2520/10; B60W 2520/105; B60W 2554/802; G05D 1/0061; G05D 1/0223
See application file for complete search history.

(56) References Cited

U.S. PATENT DOCUMENTS

2017/0341661 A1\* 11/2017 Nishiyama ............ B60W 50/14

FOREIGN PATENT DOCUMENTS

| JP | H05-156976 A | 6/1993 |
|---|---|---|
| JP | H07-125562 A | 5/1995 |
| JP | H10-309959 A | 11/1998 |
| JP | 2017-199205 A | 11/2017 |
| JP | 2018-024344 A | 2/2018 |

OTHER PUBLICATIONS

Office Action received in corresponding Japanese application No. 2019-061466 dated Feb. 16, 2021 with English translation (9 pages).

\* cited by examiner

*Primary Examiner* — Genna M Mott
*Assistant Examiner* — Andy Schneider
(74) *Attorney, Agent, or Firm* — Rankin, Hill & Clark LLP

(57) ABSTRACT

A vehicle control device which controls acceleration/deceleration of a vehicle includes: a switch controller; a recognizer; an actual vehicle-to-vehicle distance calculator; and a target vehicle-to-vehicle distance calculator. Switching criteria for the switch controller's switching the control condition from the first control condition to the second control condition include a criterion that the absolute value of a difference between an actual vehicle-to-vehicle distance calculated by the actual vehicle-to-vehicle distance calculator and a target vehicle-to-vehicle distance calculated by the target vehicle-to-vehicle distance calculator is less than or equal to a predetermined threshold.

12 Claims, 10 Drawing Sheets

VEHICLE CONTROL DEVICE, AND VEHICLE

BACKGROUND OF THE INVENTION

1. Field of the Invention

The present invention relates to a technique for a vehicle control device of autonomously driving a vehicle.

2. Description of the Related Art

Autonomous vehicle control has been studied in recent years. One such study is on the switching of a vehicle control condition corresponding to running states (such as congested traffic and smooth traffic). For example, Patent Literature 1 discloses a vehicle running control device which turns on a traffic jam mode in a case where, for example, a vehicle speed of a host vehicle is equal to or less than 40 kph and a vehicle-to-vehicle distance between the host vehicle and a preceding vehicle is equal to or less than 40 meters. Meanwhile, Patent Literature 2 discloses a vehicle control device which determines that the traffic is congested in a case where vehicle speeds of a host vehicle and vehicles around the host vehicle are continuously constant, and switches contents of drive assistance based on the driver's approval.

PRIOR ART DOCUMENT(S)

Patent Literature(s)

Patent Literature 1: JP2018-024344A
Patent Literature 2: JP2017-199205A

In the conventional techniques, a criterion for shifting the control condition is that the vehicle-to-vehicle distance is equal to or less than a predetermined value. For this reason, once the vehicle-to-vehicle distance between the host vehicle and the preceding vehicle becomes equal to or less than the predetermined value, the control condition is shifted even if the vehicle-to-vehicle distance is unstable. Conceivable factors which destabilize the vehicle-to-vehicle distance include: delay in the host vehicle's following the preceding vehicle due to a sudden acceleration or deceleration of the preceding vehicle; and failure in accurately estimating the position of the preceding vehicle due to malfunction of sensors, or the like.

The shift of the control condition in such an unstable situation is likely to cause mode hunting such as a return to the previous control condition, since the control condition is unstable. The mode hunting is a factor which irritates the driver.

SUMMARY OF THE INVENTION

The present invention has been made with the above background taken into consideration. An object of the present invention is to realize a stable shift of a control condition while a vehicle autonomously runs.

For the purpose of achieving the above object, the present invention is a vehicle control device which controls acceleration and deceleration of a host vehicle. The vehicle control device has the following feature. The vehicle control device includes: a switch controller which switches a control condition set by the vehicle control device between a first control condition and a second control condition which requires a driver to perform less of operations than the first control condition, or which automates more of the operations than the first control condition; a recognizer which recognizes a peripheral vehicle running around the host vehicle; a first distance calculator which calculates a first distance based on an actual vehicle-to-vehicle distance between the host vehicle and a preceding vehicle recognized by the recognizer; and a second distance calculator which calculates a second distance based on a target vehicle-to-vehicle distance between the host vehicle and the preceding vehicle. Switching criterion for the switch controller's switching the control condition from the first control condition to the second control condition includes a criterion that a difference between the first distance calculated by the first distance calculator and the second distance calculated by the second distance calculator is equal to or less than a predetermined threshold.

The present invention is capable of realizing the stable shift of the control condition while the vehicle autonomously runs.

DETAILED DESCRIPTION OF THE EMBODIMENTS

Next, modes for carrying out the present invention (hereinafter referred to as "embodiments") will be described in detail with reference to the accompanying drawings depending on the necessity.

First Embodiment

[Overall Configuration]

Figure 1:
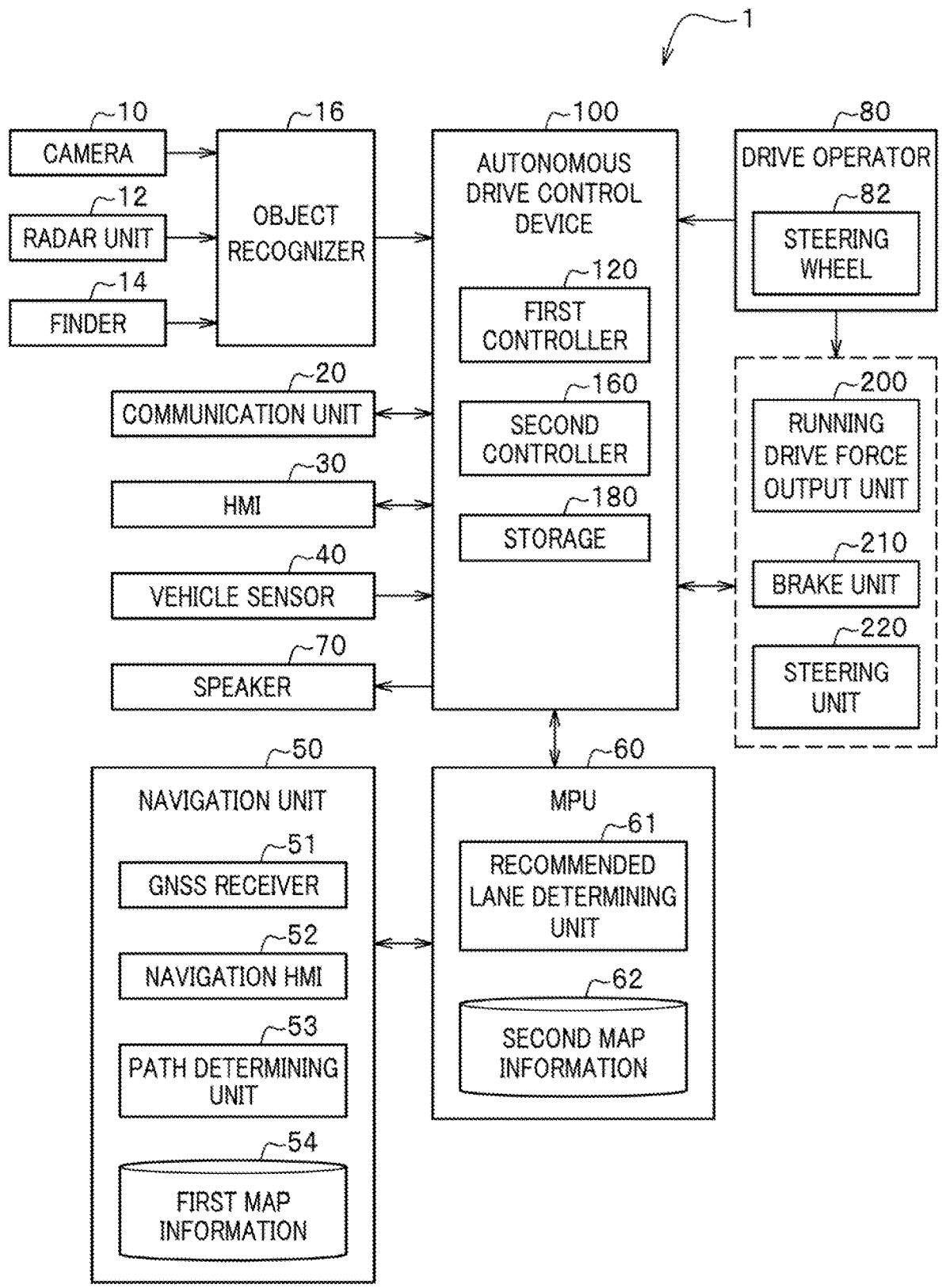
FIG. 1 is a diagram of a configuration of a vehicle system using a vehicle control device according to a first embodiment.

FIG. 1 is a diagram of a configuration of a vehicle system 1 using a vehicle control device according to the first embodiment.

Examples of a vehicle with the vehicle system 1 installed therein include two-, three- and four-wheeled vehicles, and examples of a driving source of the vehicle include an internal combustion engine, an electric motor and their combination. The electric motor operates using electric power generated by a generator linked to the internal combustion engine, or electric power discharged from a rechargeable battery or a fuel cell.

The vehicle system 1 includes, for example, a camera 10, a radar unit 12, a finder 14 and an object recognizer 16. The vehicle system 1 further includes a communication unit 20, a human-machine interface (HMI) 30 and a vehicle sensor 40. The vehicle system 1 further includes a navigation unit 50, a map positioning unit (MPU) 60 and a speaker 70. The vehicle system 1 further includes a drive operator 80, an autonomous drive control device 100, a running drive force output unit 200, a brake unit 210 and a steering unit 220. These units and apparatuses are connected together through multiplex communication lines such as a controller area network (CAN) communication lines, serial communication lines, a wireless communication networks, and the like. Incidentally, the configuration shown in FIG. 1 is just an example. Part of the configuration may be omitted, or a different configuration may be added to the configuration shown in FIG. 1.

The camera 10 is a digital camera using a solid-state imaging device, such as a charge-coupled device (CCD) or a complementary metal-oxide-semiconductor (CMOS). The camera 10 is attached to an arbitrary portion of the vehicle (hereinafter referred to as a "host vehicle") with the vehicle system 1 installed therein. In a case where an image of an environment in front of the vehicle is intended to be captured, the camera 10 is attached to an upper portion of a front windshield, a back surface of an inner rearview mirror, or the like. In a case where an image of an environment behind the host vehicle is intended to be captured, the camera 10 is attached to an upper portion of a rear windshield, or the like. The camera 10, for example, captures an image of an environment around the host vehicle repeatedly periodically. The camera 10 may be a stereo camera.

The radar unit 12 detects at least a position (distance and bearing) of an object by: transmitting electromagnetic waves in a millimeter band to surroundings of the host vehicle; and detecting electromagnetic waves reflected off the object (reflected electromagnetic waves). The radar unit 12 is attached to an arbitrary portion of the host vehicle. The radar unit 12 may be configured to detect the position and velocity of the object using a frequency-modulated continuous-wave (FM-CW) method.

The finder 14 is one using the light detection and ranging (LIDAR) method. The finder 14 illuminates the surroundings of the host vehicle with light and measures scattered light. The finder 14 detects the distance to an object based on a time from the light emission through the light reception. Light to be emitted is, for example, pulsed laser light. The finder 14 is attached to an arbitrary portion of the host vehicle.

The object recognizer 16 recognizes the position, kind, velocity and so on of the object by performing sensor fusion on results of the detections by some or all of the camera 10, the radar unit 12 and the finder 14. The object recognizer 16 outputs the recognition result to the autonomous drive control device 100. The object recognizer 16 may be configured to output the results of the detections by the camera 10, the radar unit 12 and the finder 14 to the autonomous drive control device 100 without performing the sensor fusion on the results. The object recognizer 16 may be omitted from the vehicle system 1.

The communication unit 20 communicates with other vehicles existing around the host vehicle, for example, using the cellular network, the Wi-Fi network, the Bluetooth®, dedicated short-range communications (DSRC) and the like, or communicates with various server apparatuses through radio base stations.

The HMI 30 shows various kinds of information to an occupant of the host vehicle, and receives input manipulations from the occupant. The HMI 30 includes various displays, a buzzer, a touch panel, switches, keys and the like.

The vehicle sensor 40 includes a vehicle speed sensor which detects the host vehicle's speed, an acceleration sensor which detects the host vehicle's acceleration, and a yaw rate sensor which detects the host vehicle's angular velocity around the vertical axis, and a bearing sensor which detects the host vehicle's direction.

The navigation unit 50 includes, for example, a global navigation satellite system (GNSS) receiver 51, a navigation HMI 52 and a path determining unit 53. In addition, the navigation unit 50 retains first map information 54 on a memory device such as a hard disk drive (HDD) or a flash memory. The GNSS receiver 51 identifies the position of the host vehicle based on signals received from a GNSS satellite. The position of the host vehicle may be identified or complemented by an inertial navigation system (INS) using outputs from the vehicle sensor 40. The navigation HMI 52 includes a display, a speaker, a touch panel, keys and the like. The navigation HMI 52 and the HMI 30 may be partially or entirely common to each other. The path determining unit 53 identifies the position of the host vehicle (or an arbitrary inputted position), for example, using the GNSS receiver 51. Referring to the first map information 54, the path determining unit 53 determines a path from the identified position of the host vehicle to a destination inputted by the occupant using the navigation HMI 52 (hereinafter referred to as a "path on the map"). The first map information 54 is, for example, information about road shapes drawn with links representing roads and nodes connected by the links. The first map information 54 may include information about curvatures of the roads and information about a point of interest (POI). The path on the map is outputted to the MPU 60. Based on the path on the map, the navigation unit 50 may be configured to offer a path guidance using the navigation HMI 52. The navigation unit 50 may be realized, for example, by functions of a terminal device such as a smartphone or tablet terminal which the occupant has with him/her. The navigation unit 50 may be configured to send the current position and the destination to a navigation server and acquire a path equivalent to the path on the map from the navigation server, through the communication unit 20.

The MPU 60 includes, for example, a recommended lane determining unit 61, and retains second map information 62 on the memory device such as the HDD or the flash memory. The recommended lane determining unit 61 divides the path on the map provided by the navigation unit 50 into multiple blocks (for example, multiple 100-meter-long blocks in the vehicle running direction). Subsequently, referring to the second map information 62, the recommended lane determining unit 61 determines a recommended lane for each block. The recommended lane determining unit 61 determines, for example, how many lanes be between the most left lane and the lane on which the host vehicle is going to run.

In a case where the path on the map has a road junction, the recommended lane determining unit 61 determines the recommended lane which enables the host vehicle to run on a rational path toward the road junction.

The second map information 62 is map information which is more accurate than the first map information 54. The second map information 62 includes, for example, information about the center of a lane, or information about the boundaries of the lane. The second map information 62 may further include road information, traffic control information, address information (about addresses and zip codes), facilities information, and telephone number information. The second map information 62 may be constantly updated by the communication unit 20's communications with other devices.

The speaker 70 operates to output sound under the control of the autonomous drive control device 100. The sound includes voice which informs the occupant of the host vehicle about things such as the approach of an emergency vehicle. Detailed descriptions will be later provided for contents of the information from the speaker 70.

The drive operator 80 includes, for example, an acceleration pedal, a brake pedal, a shift lever, a steering wheel, a deformed steer, a joystick, a traffic signal lamp lever, a microphone, and various switches. A sensor which detects how much the drive operator 80 is manipulated and a sensor which detects whether the drive operator 80 is manipulated are attached to the drive operator 80. Results of the detections by these sensors are outputted to the autonomous drive control device 100, or some or all of the running drive force output unit 200, the brake unit 210 and the steering unit 220.

The autonomous drive control device 100 includes, for example, a first controller 120, a second controller 160 and a storage 180. The first controller 120 and the second controller 160 are each realized by the executing of programs (software) by a hardware processor such as a central processing unit (CPU).

Some or all of these components may be realized by hardware (including circuitry) such as a large-scale integration (LSI) circuit, an application specific integrated circuit (ASIC), a field-programmable gate array (FPGA) or a graphics processing unit (GPU), or may be realized by collaboration between the software and the hardware. The program may be stored on the memory device such as the HDD or the flash memory in the storage 180 in advance. Otherwise, the program may be stored on a detachable storage medium such as a DVD or a CD-ROM, and installed into the HDD or the flash memory in the autonomous drive control device 100 when the storage medium is attached to the drive device. Incidentally, detailed descriptions will be later provided for the first controller 120, the second controller 160 and the storage 180.

Meanwhile, the running drive force output unit 200 outputs a running drive force (torque) for running the vehicle to the driving wheels. The running drive force output unit 200 includes, for example, a combination of an internal combustion engine, an electric motor, a transmission and the like, as well as an ECU which controls them. The ECU controls the above configuration in accordance with information inputted from the second controller 160 or information inputted from the drive operator 80.

The brake unit 210 includes, for example, a brake caliper, a cylinder which transmits hydraulic pressure to the brake caliper, an electric motor which generates the hydraulic pressure in the cylinder, and a brake ECU. The brake ECU outputs brake torque to the wheels corresponding to a braking operation, by controlling the electric motor in accordance with information inputted from the second controller 160 or information inputted from the drive operator 80. The brake unit 210 may include a backup mechanism which transmits the hydraulic pressure, generated by the operation of the brake pedal included in the drive operator 80, to the cylinder through the master cylinder. Incidentally, the configuration of the brake unit 210 is not limited to the above-discussed one. The brake unit 210 may be, for example, an electronically-controlled hydraulic brake unit which transmits the hydraulic pressure from the master cylinder to the cylinder by controlling an actuator in accordance with the information inputted from the second controller 160.

The steering unit 220 includes, for example, a steering ECU and an electric motor (not shown). The electric motor changes the directions of the steered wheels, for example, by making force work on a rack and pinion mechanism. The steering ECU changes the directions of the steered wheels by driving the electric motor in accordance with information inputted from the second controller 160 or information inputted from the drive operator 80.

[First Controller 120 and Second Controller 160]

Figure 2:
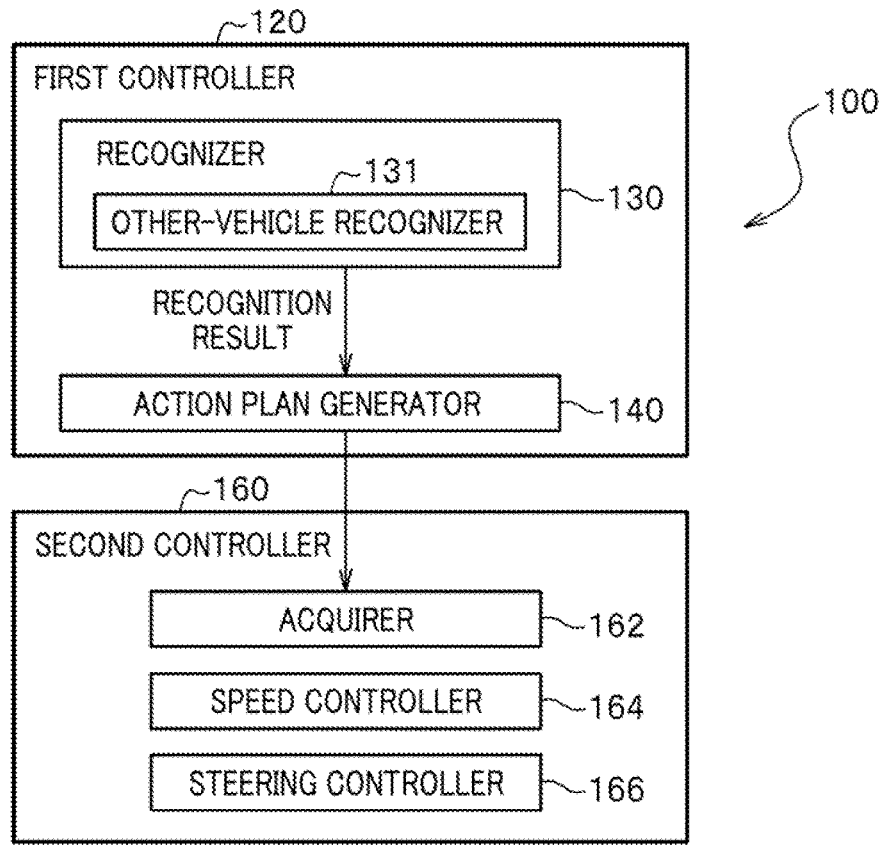
FIG. 2 is a diagram of a functional configuration of a first controller and a second controller.

FIG. 2 is a diagram of a functional configuration of the first controller 120 and the second controller 160.

The first controller 120 includes, for example, a recognizer 130 and an action plan generator 140. The first controller 120 realizes, for example, an artificial intelligence (AI)-based function and a beforehand-given model-based function in parallel. For example, a function of "recognizing an intersection" is fulfilled by recognizing an intersection by deep learning and so on, and recognizing an intersection based on beforehand given criteria (the presence of a traffic light, a traffic sign and the like which are pattern-matchable) in parallel. Furthermore, the function of "recognizing an intersection" may be fulfilled through comprehensive evaluation by scoring the two recognition results. This secures the reliability of the autonomous drive.

The recognizer 130 recognizes states (such as positions, speeds and accelerations) of objects around the host vehicle, based on information inputted from the camera 10, the radar unit 12 and the finder 14 through the object recognizer 16. The objects include other vehicles. The position of each object is recognized, for example, as a position on an absolute coordinate system with the origin representing a representative point (such as the center of gravity or the center of the drive shaft) of the host vehicle, and is used for the control. The position of the object may be represented by the representative point (such as the center of gravity or a corner) of the object, or may be an area represented by the representative point. The state of each object may include the acceleration or jerk of the object, or an action state of the object (for example, a condition in which the object is changing the lanes, or a condition indicating whether the object is going to change the lanes).

The recognizer 130 further recognizes, for example, a lane (driving lane) on which the host vehicle is running. For example, the recognizer 130 recognizes the driving lane by comparing a pattern of road dividing lines obtained from the second map information 62 and a pattern of road diving lines around the host vehicle recognized from the images captured by the camera 10. Incidentally, what are used by the recognizer 130 to recognize the driving lane are not limited to the road diving lines, and the recognizer 130 may recognize the driving lane by recognizing runway boundaries (road boundaries) which include the road diving lines, shoulders, curbs, median strips and guardrails The position of the host vehicle obtained for the navigation unit 50 and results of processes by the INS may be reflected on this recognition. The recognizer 130 further recognizes road events such as stop lines, obstacles, red traffic lights and toll gates.

When recognizing the driving lane, the recognizer 130 recognizes the position and orientation of the host vehicle relative to the driving lane. The recognizer 130 may be configured to recognize, for example, a deviation of the representative point of the host vehicle from the center of the lane, and an angle of the running direction of the host vehicle to a line joining the centers of the lane, as the position and orientation of the host vehicle relative to the driving lane. Instead, the recognizer 130 may be configured to recognize the position of the representative point of the host vehicle relative to one of the side edge portions of the driving lane (road dividing lines or road boundaries) or the like, as the position of the host vehicle relative to the driving lane.

The recognizer 130 may further include an other-vehicle recognizer 131. The other-vehicle recognizer 130 recognizes actions of other vehicles which are running around the host vehicle, based on the images captured by the camera 10.

The action plan generator 140, although later discussed in detail, basically generates a target track which the host vehicle is going to run autonomously (without depending on the manipulation of the driver) in the future, in order for the host vehicle to run on the recommended lane determined by the recommended lane determining unit 61, and to respond to a situation around the host vehicle.

The target track includes, for example, a speed element. The target track is represented, for example, as a sequential arrangement of points (track points) which the host vehicle should reach. Each track point is a point which the host vehicle should reach each time the host vehicle runs a predetermined distance (for example, approximately several meters) along the road. In addition, a target speed and a target acceleration at which the host vehicle should run each time a predetermined sampling time length (for example, approximately several tenths seconds) passes are generated as part of the target track. Furthermore, each track point may be a position which the host vehicle should reach at each of sampling times that come in intervals of the predetermined sampling time length. In this case, information about the target speed and the target acceleration is represented using intervals of the track points.

The action plan generator 140 may set events of the autonomous drive when generating the target track. The events of the autonomous drive include a constant-speed run event, a low-speed follow event in which the host vehicle runs after a preceding vehicle at a predetermined speed or less, a lane change event, a junction event, a merging event, and a takeover event. The action plan generator 140 generates the target track in accordance with an activated event.

The second controller 160 controls the running drive force output unit 200, the brake unit 210 and the steering unit 220 in order for the host vehicle to, at scheduled time, run through the target track generated by the action plan generator 140.

The second controller 160 includes, for example, an acquirer 162, a speed controller 164 and a steering controller 166. The acquirer 162 acquires information about the target track (track point) generated by the action plan generator 140, and stores the information on the memory (not shown). The speed controller 164 controls the running drive force output unit 200 (see FIG. 1) or the brake unit 210 (see FIG. 1) based on the speed element included in the target track stored on the memory. The steering controller 166 controls the steering unit 220 corresponding to the degree of curve of the target track stored on the memory. The processes performed by the speed controller 164 and a steering controller 166 are realized, for example, by a combination of feedforward control and feedback control. As an example, the steering controller 166 performs the feedforward control corresponding to the curvature of a road in front of the host vehicle, and the feedback control based on the deviation of the host vehicle from the target track, in combination.

[Action Plan Generator 140]

Figure 3:
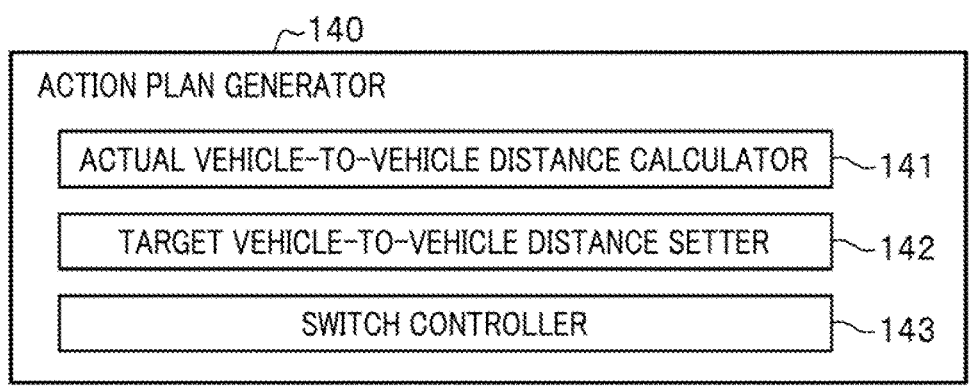
FIG. 3 is a diagram of a functional configuration of an action plan generator according to the first embodiment.

FIG. 3 is a diagram of a functional configuration of the action plan generator 140 according to the first embodiment.

The action plan generator 140 includes an actual vehicle-to-vehicle distance calculator 141, a target vehicle-to-vehicle distance setter 142 and a switch controller 143.

The actual vehicle-to-vehicle distance calculator 141 calculates an actual vehicle-to-vehicle distance Dr which is an actual distance between the preceding vehicle and the host vehicle, based on the information from the recognizer 130.

The target vehicle-to-vehicle distance setter 142 sets a target vehicle-to-vehicle distance Dt corresponding to a target vehicle-to-vehicle distance setting map 181 (discussed later) and the state of the host vehicle. The target vehicle-to-vehicle distance Dt will be discussed later. The target vehicle-to-vehicle distance setter 142 further sets a map for determining the target vehicle-to-vehicle distance Dt to be used, corresponding to the state of the host vehicle.

The switch controller 143 switches the control condition of the host vehicle (between a first control condition and a second control condition) based on the actual vehicle-to-vehicle distance Dr and the target vehicle-to-vehicle distance Dt. Incidentally, the first control condition is a control condition which allows the driver to release the hands from the steering wheel but requires the driver to monitor the environment around the host vehicle. The second control condition is a control condition which is carried out mainly during traffic jam, and which allows the driver to release the hands from the steering wheel, and not to watch the environment around the host vehicle. In other words, the second control condition is a control condition which requires the driver to perform less of the operations than the first control condition, that is to say, which automates more of the operations than the first control condition. Incidentally, the second control condition is Traffic Jam Pilot (TJP), one of the automated driving levels.

(Storage 180)

Figure 4:
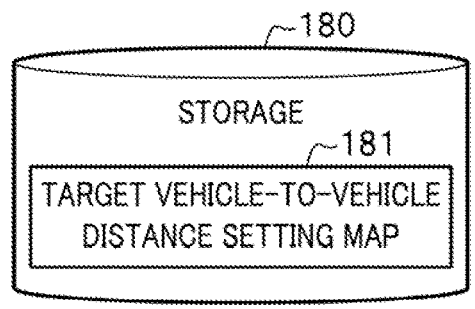
FIG. 4 is a diagram showing a configuration of a storage.
Figure 5:
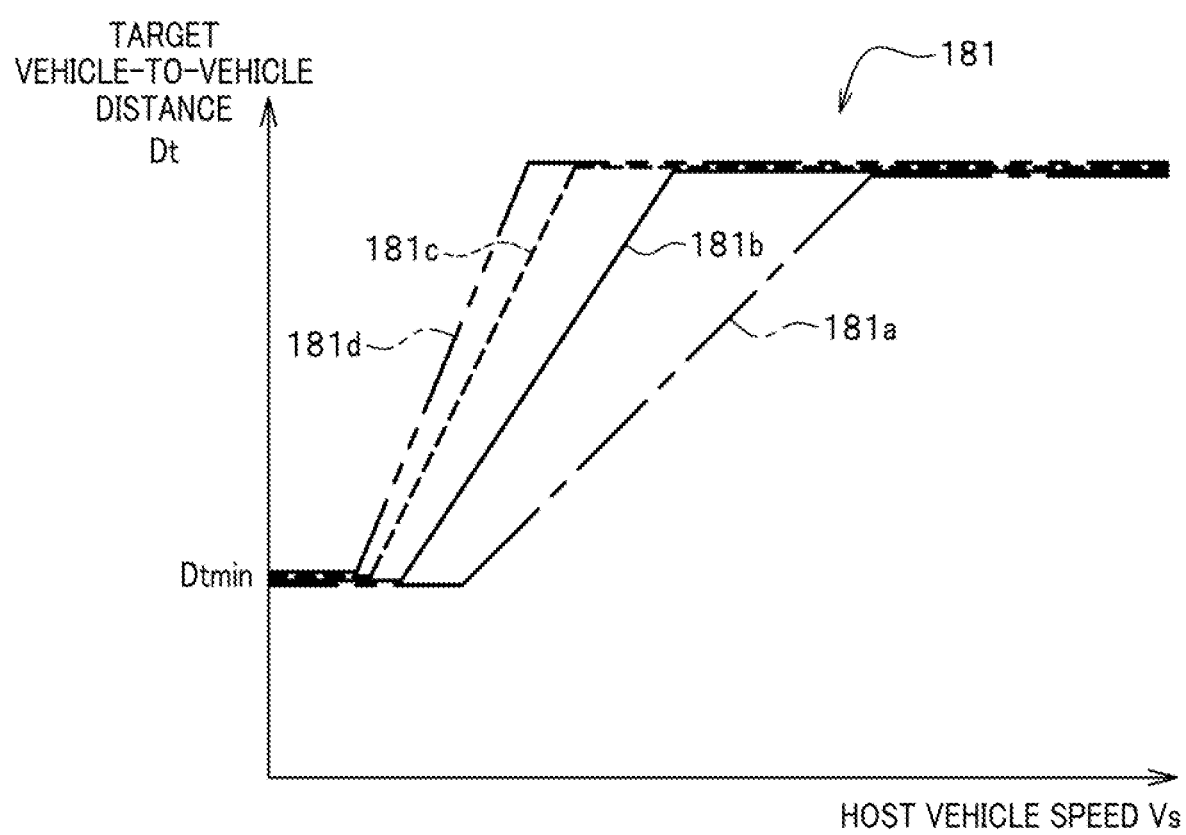
FIG. 5 is a diagram showing a target vehicle-to-vehicle distance setting map.

FIG. 4 is a diagram showing a configuration of the storage 180. FIG. 5 is a diagram showing the target vehicle-to-vehicle distance setting map 181.

As shown in FIG. 4, the storage 180 stores the target vehicle-to-vehicle distance setting map 181. Meanwhile, as shown in FIG. 5, maps which associates the vehicle speed (the host vehicle's speed Vs) and the target vehicle-to-vehicle distance Dt with each other are stored on the target vehicle-to-vehicle distance setting map 181. As shown in FIG. 5, each map is set such that until the host vehicle's speed Vs reaches a predetermined vehicle speed (for example, 50 kph in a map 181a), the target vehicle-to-vehicle distance Dt becomes larger as the host vehicle's speed Vs becomes larger (faster). In other words, ratios (or inclinations) of increases in the target vehicle-to-vehicle distance Dt to increases in the host vehicle's speed Vs are set in the target vehicle-to-vehicle distance setting map 181.

Descriptions will be later provided for how to use the target vehicle-to-vehicle distance setting map 181. In FIG. 5, maps are denoted by reference signs 181a to 181d. Incidentally, in the following description, the maps denoted by reference signs 181a, 181b, 181c, 181d are respectively referred to as "S," "M," "L" and "XL" depending on the necessity. Descriptions will be later provided for how to use the maps 181a to 181d ("S" to "XL").

As shown in FIG. 5, the target vehicle-to-vehicle distance Dt is set to become larger as the host vehicle's speed Vs becomes larger. This setting makes it possible to realize the vehicle control which gives no discomfort feeling to the driver.

It should be noted that as shown in FIG. 5, a minimum value Dtmin (for example, 4.5 m) is set in the target vehicle-to-vehicle distance Dt.

<Flowchart>
(Process of Switching Control Conditions)

Figure 6:
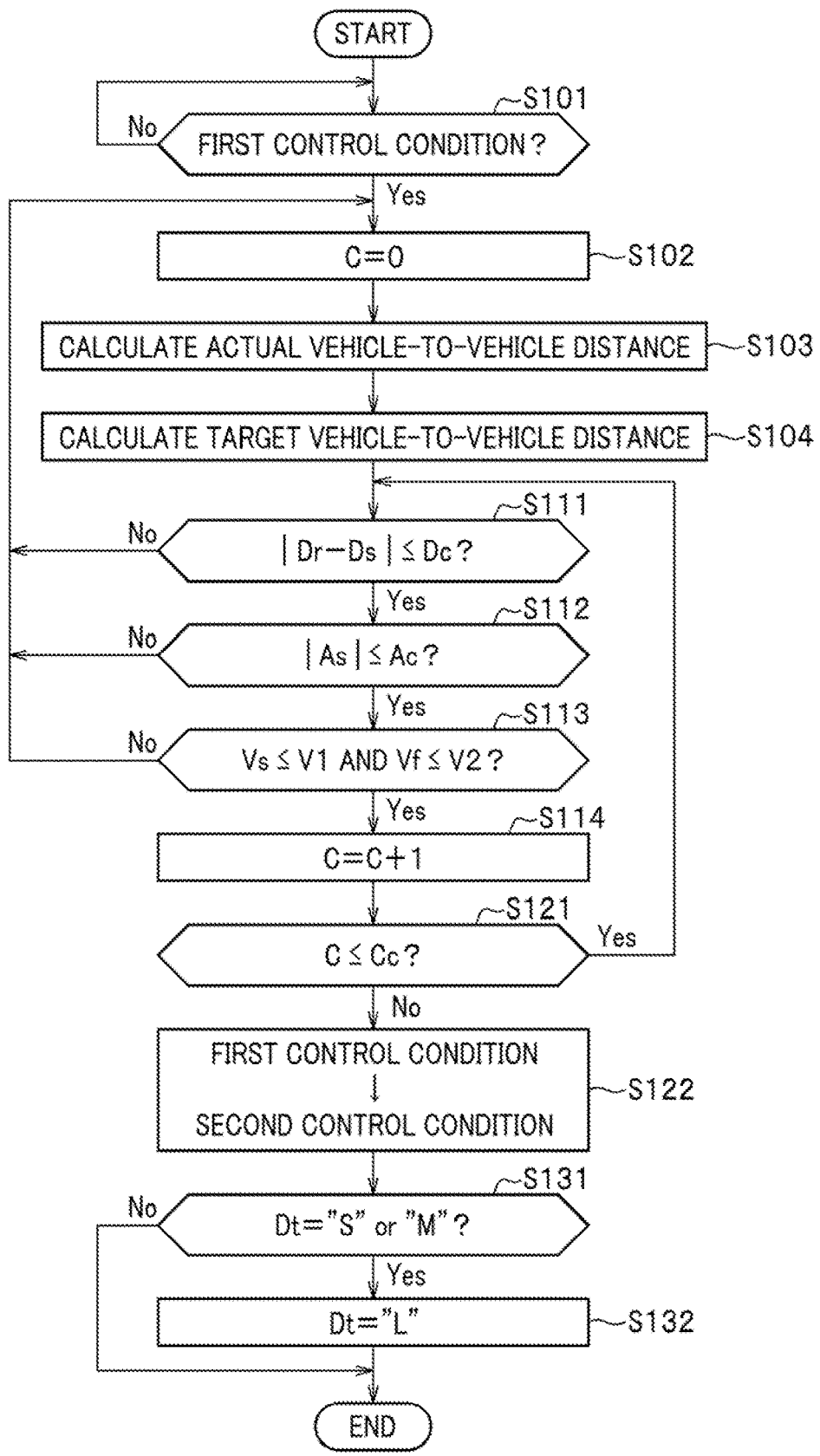
FIG. 6 is a flowchart showing a procedure for a process of switching from a first control condition to a second control condition which is performed in the first embodiment.

FIG. 6 is a flowchart showing a procedure for a process of switching from the first control condition to the second control condition which is performed in the first embodiment.

To begin with, the switch controller 143 determines whether the current control condition is the first control condition (S101).

If the result of step S101 is that the current control condition is not the first control condition (if No in step S101), the switch controller 143 returns the process to step S101.

If the result of step S101 is that the current control condition is the first control condition (if Yes in step S101), the switch controller 143 resets a count C (C=0 in step S102).

Next, the actual vehicle-to-vehicle distance calculator 141 calculates the vehicle-to-vehicle distance between the host vehicle and the preceding vehicle (the actual vehicle-to-vehicle distance Dr) (S103). The preceding vehicle is recognized by the other-vehicle recognizer 131. In addition, the distance between the host vehicle and the preceding vehicle is recognized based on the result of the detection by the radar unit 12, and the like.

Subsequently, the target vehicle-to-vehicle distance setter 142 calculates the target vehicle-to-vehicle distance Dt between the host vehicle and the preceding vehicle (S104). The target vehicle-to-vehicle distance Dt is calculated based on the host vehicle's speed Vs and the target vehicle-to-vehicle distance setting map 181 shown in FIG. 5. Incidentally, what of the maps 181a to 181d shown in FIG. 5 is used is determined by the driver in advance, as discussed later.

Figure 7:
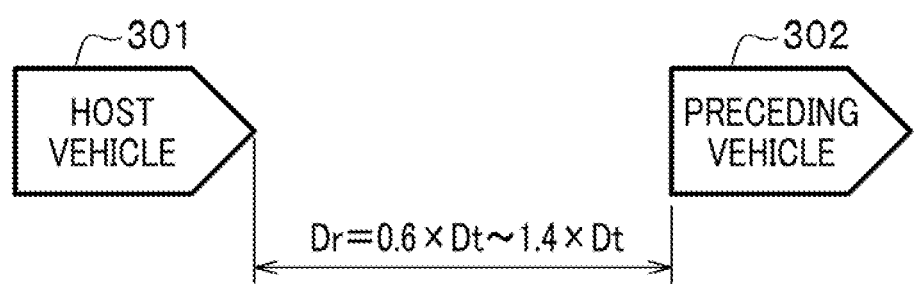
FIG. 7 is a diagram showing a relationship between an actual vehicle-to-vehicle distance and a target vehicle-to-vehicle distance in the switch from the first control condition to the second control condition.

Thereafter, the switch controller 143 determines whether the difference between the target vehicle-to-vehicle distance Dt and the actual vehicle-to-vehicle distance Dr (the absolute value of the difference between the target vehicle-to-vehicle distance Dt and the actual vehicle-to-vehicle distance Dr) is less than or equal to a predetermined value Dc (|Dt−Dr|≤Dc) (S111). For example, as shown in FIG. 7, the switch controller 143 determines whether the actual vehicle-to-vehicle distance Dr between the host vehicle 301 and the preceding vehicle 302 falls within a range of Dt±40% (that is to say, the switch controller 143 determines whether Dr=0.6×Dt~1.4×Dt). Incidentally, in the case shown in FIG. 7, in step S111, the switch controller 143 determines whether |Dt−Dr| falls within the range of Dc=Dt±40%. The target vehicle-to-vehicle distance Dt−40% means 0.6×Dt, while the target vehicle-to-vehicle distance Dt+40% means 1.4× Dt. In other words, the actual vehicle-to-vehicle distance Dr falling within the range of the target vehicle-to-vehicle distance Dt±40% means 0.6×Dt≤DF≤1.4×Dt, where DF is a deviation of the actual vehicle-to-vehicle distance Dr from the target vehicle-to-vehicle distance Dt.

If the result of step S111 is that the absolute value of the difference between the target vehicle-to-vehicle distance Dt and the actual vehicle-to-vehicle distance Dr does not fall within the predetermined value (Dt±40%) (if No in step S111), the switch controller 143 returns the process to step S102.

If the result of step S111 is |Dt−Dr|≤Dc (if Yes in step S111), the switch controller 143 determines whether the absolute value of the host vehicle's acceleration As is less than or equal to a predetermined acceleration Ac (|As|≤Ac) (S112). For example, Ac=0.1 G. In this way, if the acceleration and deceleration of the host vehicle is unstable, no control condition is switched. For this reason, if the host vehicle's acceleration unstably increases and decreases like stop-and-go, etc., the control condition is determined as unstable. Thereby, the stability of the control can be enhanced.

If the result of step S112 is that the absolute value of the host vehicle's acceleration does not fall within the predetermined acceleration Ac (if No in step S112), the switch controller 143 returns the process to step S102.

If the result of step S112 is |As|≤Ac (if Yes in S112), the switch controller 143 determines whether the host vehicle's speed Vs is less than or equal to V1 (Vs≤V1) and the preceding vehicle's speed Vf is less than or equal to V2 (Vf≤V2) (S113). In this respect, for example, V1=30 kph and V2=30 kph. However, neither V1 nor V2 is limited to the above speed.

Unless the host vehicle and the preceding vehicle are in the low-speed state like this, no control condition is switched. This scheme makes it possible to prevent the first control condition from being switched to the second control condition when the traffic is actually not jammed.

If the result of step S113 is that the host vehicle's speed is greater than V1 or the preceding vehicle's speed is greater than V2 (if No in step S113), the switch controller 143 returns the process to step S102.

If the result of step S113 is that the host vehicle's speed is less than or equal to V1 and the preceding vehicle's speed is less than or equal to V2 (if Yes in step S113), the switch controller 143 adds +1 to the count C (C=C+1 in step S114).

Thereafter, the switch controller 143 determines whether the count C is less than or equal to a predetermined value Cc (C≤Cc) (S121). This process determines whether the state satisfying the switching criteria shown in steps S111 to S113 is kept for a switch suppression time length.

If the result of step S121 is that the count C is less than or equal to the predetermined value (if Yes in step S121), the first controller 120 returns the process to step S111.

If the result of step S121 is that the count C is greater than the predetermined value (if No in step S121), the switch controller 143 switches the control condition from the first control condition to the second control condition (for example, TJP) (the first control condition to the second control condition in step S122).

Next, the switch controller 143 determines whether the current target vehicle-to-vehicle distance Dt is one of "S" and "M" (Dt="S" or "M"? in step S131).

If the result of step S131 is that the target vehicle-to-vehicle distance Dt is neither "S" nor "M" (if No in step S131), the first controller 120 terminates the process.

If the result of step S131 is that the target vehicle-to-vehicle distance Dt is "S" or "M" (if Yes in step S131), the target vehicle-to-vehicle distance setter 142 switches the target vehicle-to-vehicle distance Dt to "L" (S132). Incidentally, "S" means the map 181a in the target vehicle-to-vehicle distance setting map 181 shown in FIG. 5. Similarly, "M" means the map 181b in the target vehicle-to-vehicle distance setting map 181b. Furthermore, "L" means the map 181c in the target vehicle-to-vehicle distance setting map 181c. Incidentally, if the target vehicle-to-vehicle distance Dt is already on "L" or "XL" (the map 181d), the target vehicle-to-vehicle distance Dt is not changed. Thereafter, the first controller 120 terminates the process.

As discussed above, after the shift to the second control condition, the target vehicle-to-vehicle distance Dt is made longer. This makes it possible to secure a longer spare time for the vehicle system 1 to make determination, or a longer spare time for the drive change, for example, even if the preceding vehicle applies a sudden brake. As a result, the brake can be easily operated with enough time, or the drive can be changed easily. Like this, the second control condition secures a longer vehicle-to-vehicle distance, and can thus enhance the comfortableness and stability.

[Changes in Parameters with Time]

Figure 8:
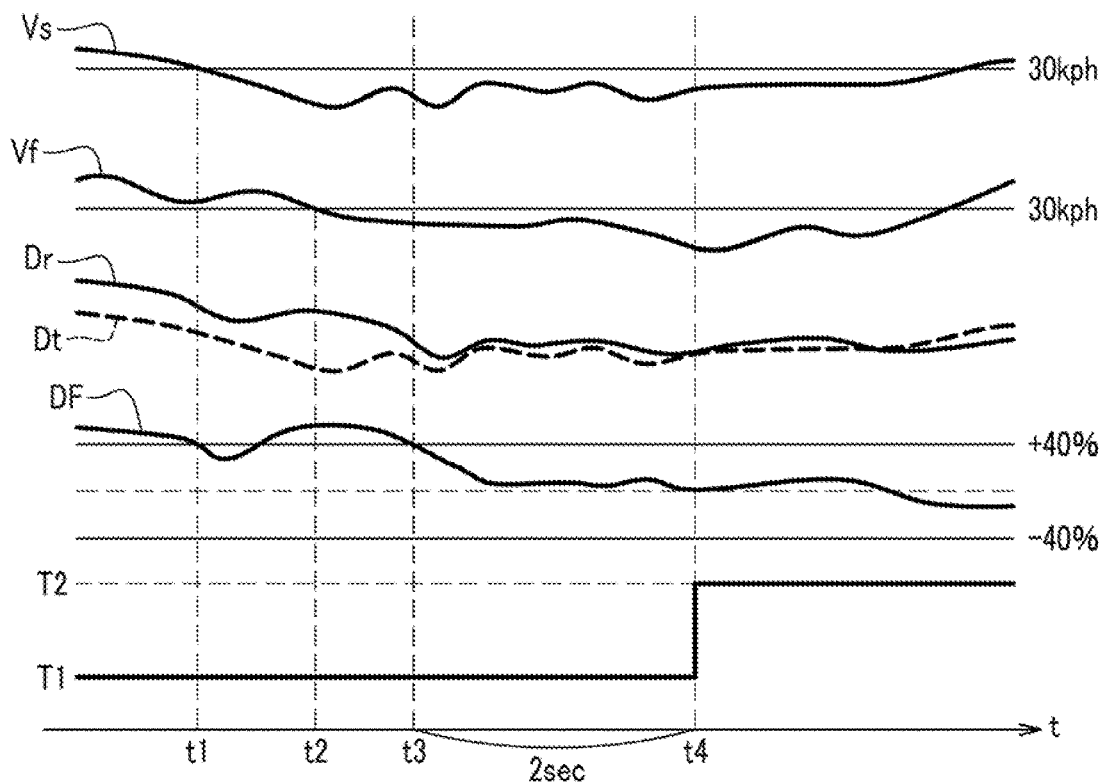
FIG. 8 is a diagram (Part 1) showing how parameters change with time in the first embodiment.
Figure 9:
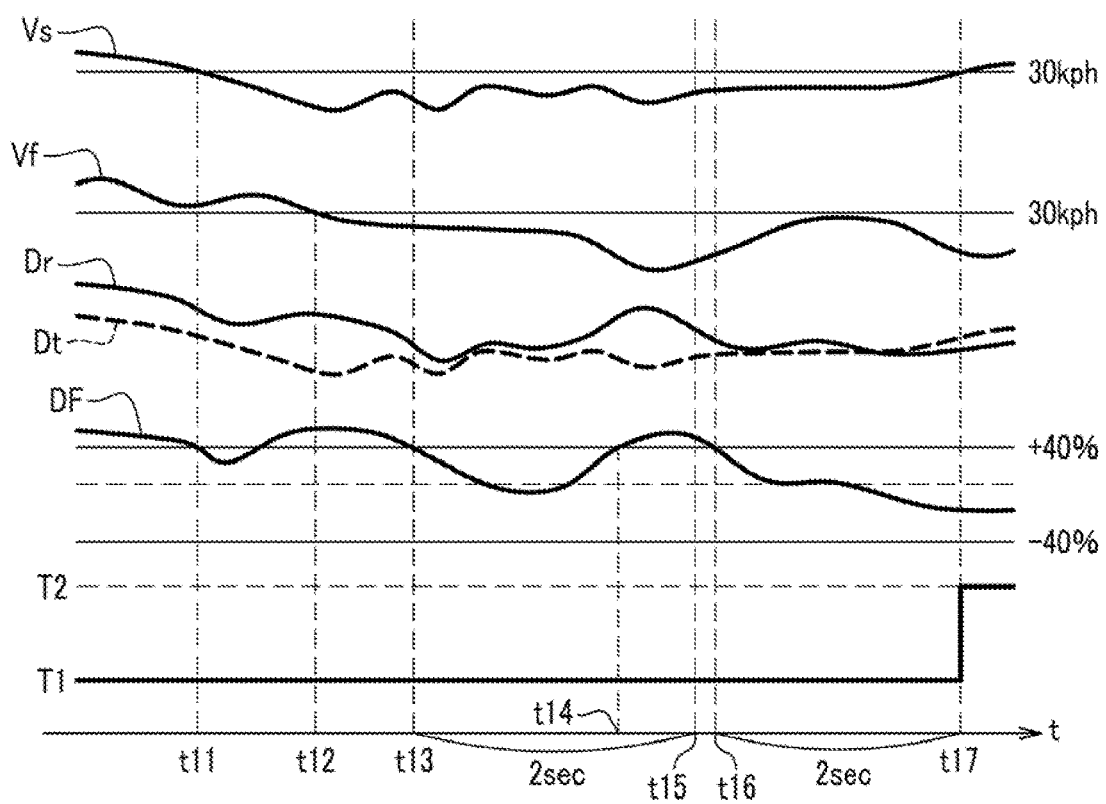
FIG. 9 is a diagram (Part 2) showing how the parameters change with time in the first embodiment.

FIGS. 8 and 9 are diagrams showing how parameters change with time in the first embodiment. In FIGS. 8 and 9, the horizontal axis represents time.

As shown in FIG. 8, to begin with, at time 0, the host vehicle's speed Vs becomes equal to or less than the predetermined speed V1 (V1=30 kph in the case shown in FIG. 8). Thereafter, at time t2, the preceding vehicle's speed Vf becomes equal to or less than the predetermined speed V2 (V2=30 kph in the case shown in FIG. 8). In other words, at time t2, all the criteria for determining "Yes" in step S113 in FIG. 6 are satisfied.

After that, at time t3, the absolute value of the deviation DF of the actual vehicle-to-vehicle distance Dr from the target vehicle-to-vehicle distance Dt falls within the predetermined value (Dt±40%, that is to say, 0.6×Dt≤DF≤1.4×Dt, in the case shown in FIG. 8). In other words, at time t3, all the criteria for determining "Yes" in step S111 are satisfied.

If the host vehicle's acceleration As is already equal to or less than the predetermined acceleration, all the criteria for determining "Yes" in steps S111 to S113 in FIG. 6 are satisfied at time t3.

Thereafter, until time t4, that is to say, until the switch suppression time length (two seconds in the case shown in FIG. 8) passes after time t3, all the criteria for determining "Yes" in steps S111 to S113 are kept satisfied. Thus, at time t4, the control condition is switched from the first control condition (T1) to the second control condition (T2).

Meanwhile, in FIG. 9, to begin with, at time t11, the host vehicle's speed Vs becomes equal to or less than the predetermined speed V1 (V1=30 kph in the case shown in FIG. 9), like in FIG. 8. Thereafter, at time t12, the preceding vehicle's speed Vf becomes equal to or less than the predetermined speed V2 (V2=30 kph in the case shown in FIG. 9). In other words, at time t12, all the criteria for determining "Yes" in step S113 in FIG. 6 are satisfied.

After that, at time t13, the absolute value of the deviation DF of the actual vehicle-to-vehicle distance Dr from the target vehicle-to-vehicle distance Dt falls within the predetermined value (Dt±40%, that is to say, 0.6×Dt≤DF≤1.4×Dt, in the case shown in FIG. 9). In other words, at time t13, all the criteria for determining "Yes" in step S111 are satisfied.

If the host vehicle's acceleration As is already equal to or less than the predetermined acceleration, all the criteria for determining "Yes" in steps S111 to S113 in FIG. 6 are satisfied at time t13.

However, at time t14, before 2 seconds passes after time t13 (that is to say, before time t15), the absolute value of the deviation DF of the actual vehicle-to-vehicle distance Dr from the target vehicle-to-vehicle distance Dt is greater than the predetermines value. This means determining "No" in step S111 in FIG. 6. Thus, as shown in FIG. 6, the count C is reset.

Thereafter, at time t16, the absolute value of the deviation DF of the actual vehicle-to-vehicle distance Dr from the target vehicle-to-vehicle distance Dt again falls within the predetermined value (Dt±40%, that is to say, 0.6×Dt≤DF≤1.4×Dt, in the case shown in FIG. 9). In other words, at time t16, all the criteria for determining "Yes" in step S111 are satisfied.

If the host vehicle's acceleration As is already equal to or less than the predetermined acceleration, all the criteria for determining "Yes" in steps S111 to S113 in FIG. 6 are satisfied at time t16.

Thereafter, until time t17, that is to say, until the switch suppression time length (two seconds in the case shown in FIG. 9) passes after time t16, all the criteria for determining "Yes" in steps S111 to S113 are kept satisfied. Thus, at time t17, the control condition is switched from the first control condition (T1) to the second control condition (T2).

It should be noted that in this embodiment, the time length from the satisfaction of all the switching criteria to the switch of the control condition is two seconds. However, the time length is not limited to this. Incidentally, the time length from the satisfaction of all the switching criteria to the switch of the control condition (two seconds in FIGS. 8 and 9) is a fixed value which has nothing to do with environmental factors such as the weather. In addition, in this embodiment, the time period from the satisfaction of all the switching criteria to the switch of the control condition may use a distance instead of the time length. For example, the control condition may be changed in a case when the host vehicle runs 20 m or more with the switching criteria all kept satisfied.

As discussed above, in the first embodiment, no condition switch is performed unless the predetermined time period (two seconds in the case shown in FIGS. 7 and 8) passes and all the switch criteria are satisfied. Thus, in the case where the switching criteria are satisfied only for a moment, no control condition is switched. This makes it possible to enhance the accuracy with which to determine whether the control is stable. Incidentally, the switching criteria include (A1) 0.6×Dt≤DF≤1.4×Dt, (A2) |As|≤Ac, and (A3) Vs≤V1 and Vf≤V2.

In the embodiment, it is determined whether the deviation DF of the actual vehicle-to-vehicle distance Dr from the target vehicle-to-vehicle distance Dt falls within the range of Dt±40% (that is to say, whether 0.6×Dt≤DF≤1.4×Dt). However, what is determined is not limited to this. The determination may be made based on a rate at which the actual vehicle-to-vehicle distance Dr and the target vehicle-to-vehicle distance Dt become equal to each other, how small the deviation DF of the actual vehicle-to-vehicle distance Dr from the target vehicle-to-vehicle distance Dt is by meters, or the like.

As discussed above, the switch of the control condition from the first control condition to the second control condition depends on whether the difference between the actual vehicle-to-vehicle distance Dr and the target vehicle-to-vehicle distance Dt falls within the predetermined range. This makes it possible to recognize whether the control is performed in accordance with the target set by the vehicle system 1. Thus, the control condition can be prevented from being shifted while the control is unstable. Accordingly, the shift of the control condition can be suppressed while the situation is not desirable, and the mode hunting can be prevented.

In addition, in the first embodiment, the count C starts to be counted once the switching criteria gets satisfied, and the count C is reset once the switching criteria gets dissatisfied. In other words, if the switching criteria get dissatisfied even for a moment, the state in which the host vehicle is following the preceding vehicle is considered as unstable, and the control condition is not switched. This makes it possible to enhance the accuracy with which to make determination on the stability.

(Process of Terminating Second Control Condition)

Figure 10:
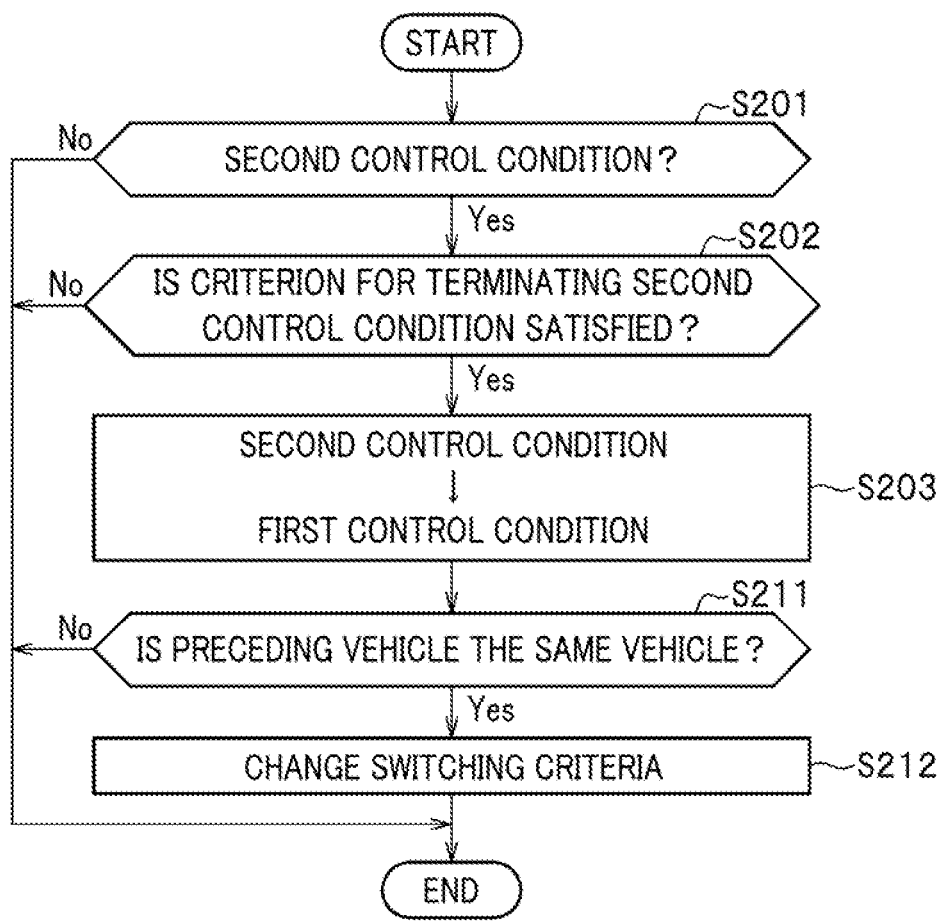
FIG. 10 is a flowchart showing a procedure for a process of terminating the second control condition which is performed in the first embodiment.

FIG. 10 is a flowchart showing a procedure for a process of terminating the second control condition which is performed in the first embodiment.

To begin with, the switch controller 143 determines whether the current condition is the second control condition (S201).

If the result of step S201 is that the current condition is not the second control condition (if No in step S201), the first controller 120 terminates the process.

If the result of step S201 is that the current condition is the second control condition (if Yes in step S201), the switch controller 143 determines whether a criterion for terminating the second control condition is satisfied (S202). In this respect, the criterion for terminating the second control condition is that one of (A1) $0.6 \times Dt \leq DF \leq 1.4 \times Dt$, (A2) $|As| \leq Ac$, and (A3) $Vs \leq V1$ and $Vf \leq V2$, which are described in the first embodiment, is not satisfied.

If the result of step S202 is that the criterion for terminating the second control condition is not satisfied (if No in step S202), the first controller 120 terminates the process.

If the result of step S202 is that the criterion for terminating the second control condition is satisfied (if Yes in step S202), the switch controller 143 terminates the second control condition, and switches the control condition to the second control condition (the second control condition to the first control condition in step S203).

Subsequently, the other-vehicle recognizer 131 determines whether the preceding vehicle is identical to the vehicle in FIG. 6 which the host vehicle follows when the control condition is shifted to the second control condition (that is to say, the identical vehicle) (S211). The other-vehicle recognizer 131 determines whether the preceding vehicle is identical to the vehicle which the host vehicle follows when the control condition is shifted to the second control condition, by performing pattern matching based on the form, color and the like of the preceding vehicle. The other-vehicle recognizer 131 may be configured to determine whether the preceding vehicle is identical to the vehicle which the host vehicle follows when the control condition is shifted to the second control condition, by recognizing the license plate of the preceding vehicle if possible.

If the result of step S211 is that the preceding vehicle is not identical to the vehicle which the host vehicle follows when the control condition is shifted to the second control condition (if No in step S211), the first controller 120 terminates the process.

If the result of step S211 is that the preceding vehicle is identical to the vehicle which the host vehicle follows when the control condition is shifted to the second control condition (if Yes in step S211), the switch controller 143 changes the switching criteria (S212), and the first controller 120 terminates the process. In step S212, at least one of the following (Y1) and (Y2) is performed.

(Y1) The switch suppression time length is shortened. In other words, a threshold Cc of the count C in step S121 in FIG. 6 is changed to a smaller value.

(Y2) A threshold V1 in step S113 in FIG. 6 is increased.

As discussed above, in the first embodiment, if the preceding vehicle is identical to the vehicle which the host vehicle follows when the control condition is shifted to the second control condition, part of the switching criterion is eased. Since the preceding vehicle which the host vehicle follows when the control condition is shifted to the second control condition is once found as being easy to follow stably, it is possible to determine that the preceding vehicle is easy to follow stably again. Thus, if the preceding vehicle is identical to the vehicle which the host vehicle follows when the control condition is shifted to the second control condition, the time period for which the second control condition continues can be made longer by the changing of the threshold Cc of the count C to a smaller value, and the reducing of the threshold V1 of the host vehicle's speed Vs. This makes it possible to keep the load of the driver lower for longer time.

Second Embodiment

Figure 11:
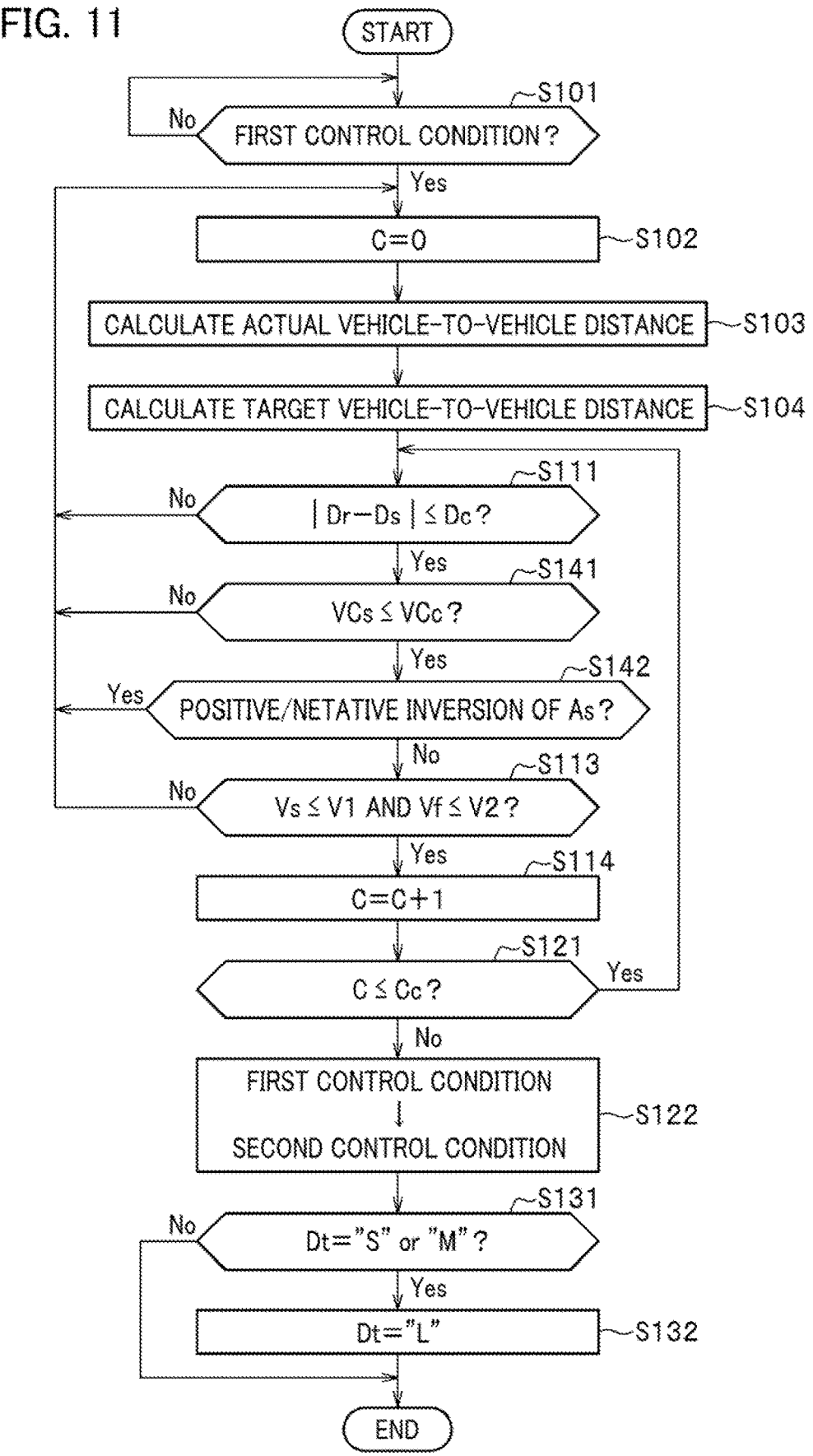
FIG. 11 is a flowchart showing a procedure for a process of switching from a first control condition to a second control condition which is performed in a second embodiment.

FIG. 11 is a flowchart showing a procedure for a process of switching from the first control condition to the second control condition which is performed in the second embodiment.

Incidentally, steps in FIG. 11 which are the same as those in FIG. 6 will be denoted by the same reference sings, and descriptions for them will be omitted.

If the determination in step S111 is "Yes," the switch controller 143 determines that the total sum VCs ($=\Sigma|VSs|$) of the absolute values of amounts VSs of changes in the speed of the host vehicle is equal to or less than a predetermined change amount VCc (VCs≤VCc) (S141). In this respect, an amount of change in the speed is an amount of change in only the speed excluding the time component. In other words, in step S141, it is determined whether the host vehicle is running at or near a constant speed.

If the result of step S141 is that the total sum VCs of the absolute values of amounts VSs of changes in the speed of the host vehicle is greater than a predetermined change amount VCc (if No in step S141), the first controller 120 returns the process to step S102.

If the result of step S141 is VCs≤VCc (if Yes in step S141), the switch controller 143 determines whether positive/negative inversion of the host vehicle's acceleration As occurs (S142).

If the result of step S142 is that the positive/negative inversion of the host vehicle's acceleration As occurs (if Yes in step S142), the first controller 120 returns the process to step S102.

If the result of step S142 is that the positive/negative inversion of the host vehicle's acceleration As does not occur (if No in step S142), the switch controller 143 advances the process to step S113.

In short, in the second embodiment, the switching criteria include (A1) $0.6 \times Dt \leq DF \leq 1.4 \times Dt$, (B2) VCs≤VCc, and (B3) no positive/negative inversion of the acceleration As.

In addition, in the second embodiment, the criterion for terminating the second control condition is that one of (A1) $0.6 \times Dt \leq DF \leq 1.4 \times Dt$, (B2) VCs≤VCc, and (B3) no positive/negative inversion of the acceleration As is not satisfied.

For example, large fluctuations in host vehicle's speed Vs means an unstable state. In the second embodiment, unless the total sum VCs of the absolute values of amounts VSs of changes in the speed of the host vehicle is equal to or less than the predetermined change amount VCc, no control condition is switched. This makes it possible to enhance the accuracy with which to determinate whether the state is stable.

Furthermore, the occurrence of the positive/negative inversion of the acceleration (that is to say, the acceleration or deceleration of the host vehicle in the predetermine time period) also means an unstable state. In the second embodiment, in the case where the positive/negative inversion of the acceleration of the host vehicle occurs in the predetermine time period, no control condition is switched. This makes it possible to enhance the accuracy with which to determinate whether the state is stable.

Third Embodiment

Figure 12:
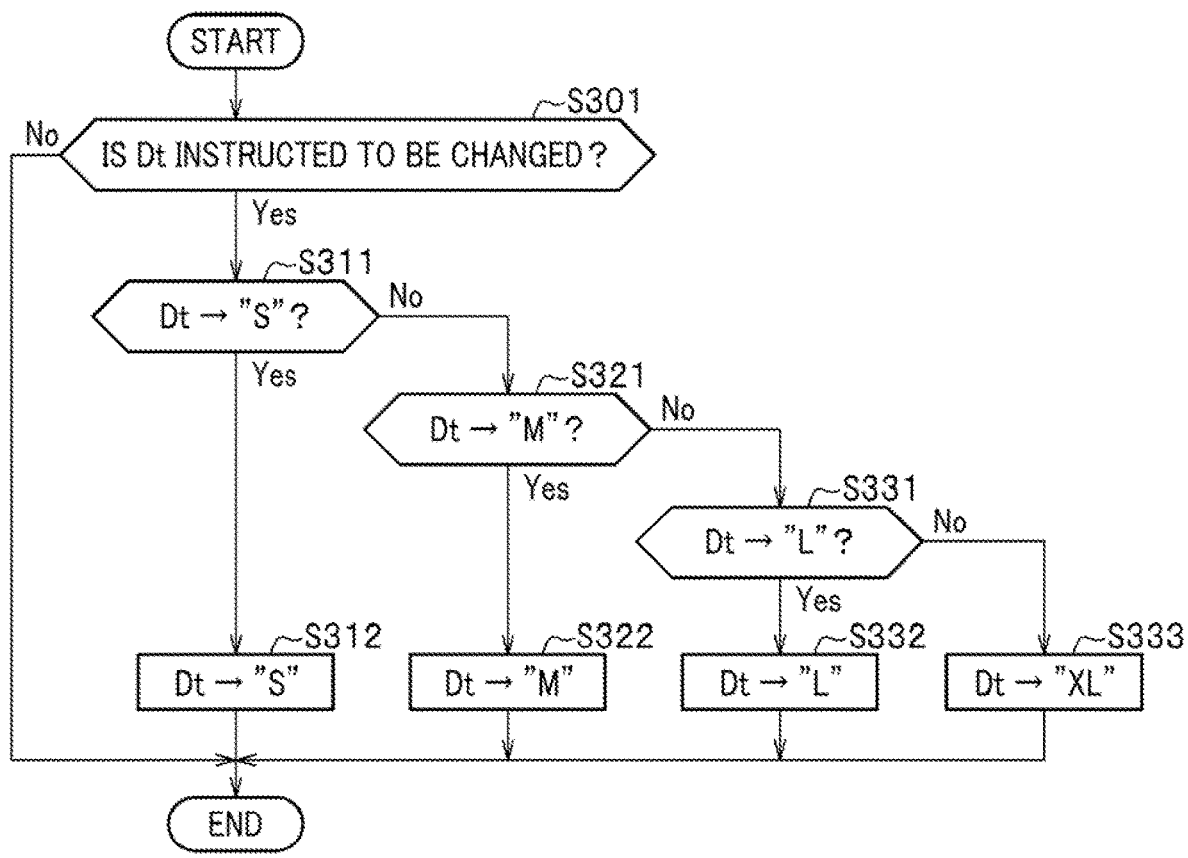
FIG. 12 is a flowchart showing a procedure for a process of setting a target vehicle-to-vehicle distance which is performed in a third embodiment.

FIG. 12 is a flowchart showing a procedure for a process of setting a target vehicle-to-vehicle distance which is performed in a third embodiment.

It should be noted that the process shown in FIG. 12 is a process to be performed at a timing when the host vehicle runs for the first time, or at a similar timing. Incidentally, in FIG. 12, the setting of the target vehicle-to-vehicle distance Dt to "S" means the setting of the map 181a of the target vehicle-to-vehicle distance setting map 181 shown in FIG. 5. Similarly, the setting of the target vehicle-to-vehicle distance Dt to "M" means the setting of the map 181b of the target vehicle-to-vehicle distance setting map 181 shown in FIG. 5. Furthermore, the setting of the target vehicle-to-vehicle distance Dt to "L" means the setting of the map 181c of the target vehicle-to-vehicle distance setting map 181 shown in FIG. 5. Moreover, the setting of the target vehicle-to-vehicle distance Dt to "XL" means the setting of the map 181d of the target vehicle-to-vehicle distance setting map 181 shown in FIG. 5.

To begin with, the target vehicle-to-vehicle distance setter 142 determines whether the target vehicle-to-vehicle distance Dt is instructed to be changed, using the navigation HMI 52 (S301).

If the result of step S301 is that the target vehicle-to-vehicle distance Dt is not instructed to be changed (if No in step S301), the first controller 120 terminates the process.

If the result of step S301 is that the target vehicle-to-vehicle distance Dt is instructed to be changed (if Yes in step S301), the target vehicle-to-vehicle distance setter 142 determines whether the target vehicle-to-vehicle distance Dt is instructed to be set to "S" (Dt to "S"? in step S311). This instruction is issued, for example, using the navigation HMI 52.

If the result of step S311 is that the target vehicle-to-vehicle distance Dt is instructed to be set to "S" (if Yes in step S311), the target vehicle-to-vehicle distance setter 142 sets the target vehicle-to-vehicle distance Dt to "S" (Dt to "S" in step S312). Thereafter, the first controller 120 terminates the process.

If the result of step S311 is that the target vehicle-to-vehicle distance Dt is not instructed to be set to "S" (if No in step S311), the target vehicle-to-vehicle distance setter 142 determines whether the target vehicle-to-vehicle distance Dt is instructed to be set to "M" (Dt to "M"? in step S321). This instruction is issued, for example, using the navigation HMI 52.

If the result of step S321 is that the target vehicle-to-vehicle distance Dt is instructed to be set to "M" (if Yes in step S321), the target vehicle-to-vehicle distance setter 142 sets the target vehicle-to-vehicle distance Dt to "M" (Dt to "M" in step S322). Thereafter, the first controller 120 terminates the process.

If the result of step S321 is that the target vehicle-to-vehicle distance Dt is not instructed to be set to "M" (if No in step S321), the target vehicle-to-vehicle distance setter 142 determines whether the target vehicle-to-vehicle distance Dt is instructed to be set to "L" (Dt to "L"? in step S331). This instruction is issued, for example, using the navigation HMI 52.

If the result of step S331 is that the target vehicle-to-vehicle distance Dt is instructed to be set to "L" (if Yes in step S331), the target vehicle-to-vehicle distance setter 142 sets the target vehicle-to-vehicle distance Dt to "L" (Dt to "L" in step S332). Thereafter, the first controller 120 terminates the process.

If the result of step S331 is that the target vehicle-to-vehicle distance Dt is not instructed to be set to "L" (if No in step S331), the target vehicle-to-vehicle distance setter 142 sets the target vehicle-to-vehicle distance Dt to "XL" (Dt to "XL" in step S333). Thereafter, the first controller 120 terminates the process.

In the third embodiment, the target vehicle-to-vehicle distance Dt until the control condition is shifted to the second control condition is set by the driver. In other words, in the step until the control condition is shifted to the second control condition, the target vehicle-to-vehicle distance Dt set by the driver is not changed. This makes it possible to reduce a discomfort feeling which is felt by the driver.

It should be noted that in the embodiment, the case where the actual vehicle-to-vehicle distance Dr falls within the range of Dt±40% is described as one of the criteria for switching the control condition to the second control condition. In other words, the case where the allowable width is $0.6 \times Dt \leq Dr \leq 1.4 \times Dt$ is described as one of the criteria for switching the control condition to the second control condition. Incidentally, although in the embodiment, the allowable widths in the respective positive and negative directions set to the target vehicle-to-vehicle distance Dt are equal to each other, the allowable width in the positive direction may be set longer than the allowable width in the negative direction. The setting of the "longer allowable width in the positive direction makes it possible to make a temporarily-increased vehicle-to-vehicle distance resulting from a sudden acceleration of the preceding vehicle fall within the range for the stable follow even in a case where the preceding vehicle which the host vehicle follows suddenly accelerates temporarily while running in the vehicle speed range equal to or less than V2.

Thereby, the length of the second control condition can be made loner, and the driving load of the driver can be reduced.

Incidentally, a sudden acceleration of the preceding vehicle above V2 dissatisfies the criterion (A3), and does not allow the control condition to be shifted to the second control condition.

In the embodiment, the five followings are described as the switching criteria.

(A1) $0.6 \times Dt \leq DF \leq 1.4 \times Dt$;
(A2) $|As| \leq Ac$;
(A3) $Vs \leq V1$ and $Vf \leq V2$;
(B2) $VCs \leq VCc$; and
(B3) no positive/negative inversion of the acceleration As.

Out of them, (A1) is essential, but the four others do not have to be used. Otherwise, at least one of the four others may be used. Otherwise, two or more of (A2), (A3), (B2) and (B3) may be arbitrarily used in combination.

[Hardware Configuration]

Figure 13:
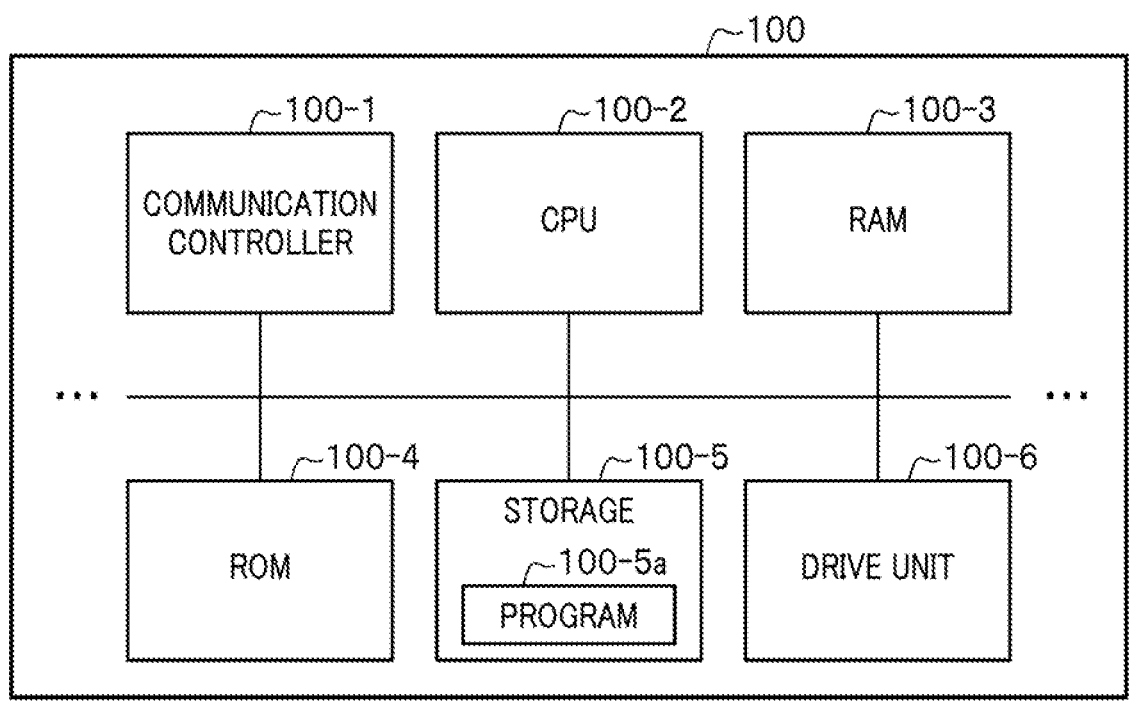
FIG. 13 is a diagram showing an example of a hardware configuration of an autonomous drive control device.

FIG. 13 is a diagram showing an example of a hardware configuration of the autonomous drive control device 100.

As shown in FIG. 13, the autonomous drive control device 100 has the hardware configuration in which a communication controller 100-1, a CPU 100-2, a random access memory (RAM) 100-3 to be used as a working memory, a read-only memory (ROM) 100-4 to store a boot program and the like, a memory device 100-5 such as a flash memory or a hard disk drive (HDD), a drive device 100-6 and the like are connected together via an internal bus or a dedicated communication line. The communication controller 100-1 communicates with the components outside the autonomous drive control device 100. The memory device 100-5 stores a program 100-5a to be executed by the CPU 100-2. The program 100-5a is expanded in the RAM 100-3 by a direct memory access (DMA) controller (not shown) or the like, and is executed by the CPU 100-2. Thereby, some or all of the recognizer 130, the action plan generator 140 and the second controller 160 are realized.

What is claimed is:

1. A vehicle control device which controls acceleration and deceleration of a host vehicle, comprising:
   a switch controller which switches a control condition set by the vehicle control device between a first control condition and a second control condition which requires a driver to perform fewer operations than the first control condition, or which automates more operations than the first control condition;
   a recognizer which recognizes a peripheral vehicle running around the host vehicle;
   a first distance calculator which calculates a first distance based on an actual vehicle-to-vehicle distance between the host vehicle and a preceding vehicle recognized by the recognizer; and
   a second distance calculator which calculates a second distance based on a target vehicle-to-vehicle distance between the host vehicle and the preceding vehicle, wherein
   switching criteria for the switch controller's switching the control condition from the first control condition to the second control condition include a criterion that a difference between the first distance calculated by the first distance calculator and the second distance calculated by the second distance calculator is equal to or less than a predetermined threshold, and
   the switching criteria further include a criterion that a running state where the difference between the first distance calculated by the first distance calculator and the second distance calculated by the second distance calculator is equal to or less than the predetermined threshold is kept for a predetermined time period.

2. The vehicle control device according to claim 1, wherein
   the second distance becomes wider as a vehicle speed of the host vehicle becomes higher.

3. The vehicle control device according to claim 1, further comprising a vehicle sensor configured to detect acceleration of the host vehicle,
   wherein the switching criteria further include a criteria that the acceleration of the host vehicle falls within a predetermined range.

4. The vehicle control device according to claim 1, wherein
   the switching criteria further include a criterion that a total sum of absolute values of amounts of changes in the vehicle speed of the host vehicle in the running state where the difference between the first distance and the second distance is equal to or less than the predetermined threshold is equal to or less than a predetermined threshold.

5. The vehicle control device according to claim 1, further comprising a vehicle sensor configured to detect acceleration of the host vehicle,
   Wherein the switching criteria further include a criterion that the acceleration of the host vehicle in the running state continues being a positive acceleration or a negative acceleration.

6. The vehicle control device according to claim 1, wherein
   when the running state where the difference between the first distance and the second distance is equal to or less than the predetermined threshold is detected, a count for a time period for which the running state continues is started, and
   in a case where the continuation time period does not reach a predetermined time period, the count is reset.

7. The vehicle control device according to claim 1, wherein
   the switching criteria includes at least one of
      the vehicle speed of the host vehicle being equal to or less than a first speed threshold, and
      a vehicle speed of the preceding vehicle being equal to or less than a second speed threshold.

8. The vehicle control device according to claim 7, wherein
   when the preceding vehicle remains the same when a switch from the first control condition to the second control condition is followed by a switch from the second control condition to the first control condition, switch controller performs at least one of
   shortening a switch suppression time length for which the same control condition is required to be kept and
   increasing the first speed threshold.

9. The vehicle control device according to claim 1, wherein
   when the host vehicle is in the first control condition, the second distance calculator calculates the second distance based on a selected first setting or second setting selected based on a user input, and determination on the switching criteria by the switch controller is made based on the second distance calculated based on the selected one of the first setting and the second setting, wherein a length of the second distance corresponding to the vehicle speed of the host vehicle from the second setting is longer than the first setting.

10. The vehicle control device according to claim 9, wherein
    when the second distance is calculated by the second distance calculator based on the first setting, and the control condition is shifted to the second control condition, the second distance calculator automatically calculates the second distance based on the second setting.

11. The vehicle control device according to claim 1, wherein
    the first distance is the actual vehicle-to-vehicle distance, and
    the second distance is the target vehicle-to-vehicle distance.

12. A vehicle comprising the vehicle control device according to claim 1.

* * * * *